United States Patent Office 3,247,230
Patented Apr. 19, 1966

3,247,230
PROCESS FOR THE MANUFACTURE OF 19-NOR-STEROID ENOL ESTERS
Ulrich Heuschkel, Basel, and Hugo Frey, Olten, Switzerland, assignors to Ciba Corporation, New York, N.Y., a corporation of Delaware
No Drawing. Filed June 30, 1964, Ser. No. 379,363
Claims priority, application Switzerland, July 18, 1963, 8,960/63
11 Claims. (Cl. 260—397.4)

The present invention provides a new process for the manufacture of $\Delta^{3,5}$-3-enolethers of $\Delta^4$-3-oxo-19-norsteroids starting from $\Delta^{5(10)}$-3-oxo-19-norsteroids.

It is known that $\Delta^4$-3-oxo-19-norsteroids can be converted into the corresponding $\Delta^{3,5}$-3-enolethers with an etherifying agent in the presence of an acidic catalyst. However, when the starting material used was an unsaturated 3-oxo-19-norsteroid in which the double bond is not in a conjugated position relatively to the 3-oxo group, for example in position 5(6) or 5(10), the double bond was hitherto transferred into the 4(5)-position before forming the ether; this can be achieved, for example, by treatment with an acid, a base or alumina. Furthermore, it is known that it is more difficult to transfer in a 3-oxosteroid a 5(10)-double bond into the 4(5)-position than a 5(6)-double bond.

It has now surprisingly been observed that in the manufacture of the afore-mentioned enolethers starting from $\Delta^{5(10)}$-3-oxo-19-norsteroids it is not necessary to isomerise the latter to $\Delta^4$-3-oxo-19-norsteroids and then to form the enolether.

Thus, according to the present process for the manufacture of $\Delta^{3,5}$-3-enolethers of $\Delta^4$-3-oxo-19-norsteroids a $\Delta^{5(10)}$-3-oxo-19-norsteroid is reacted with an etherifying agent in the presence of an acidic catalyst.

It could not have been foreseen that the products of the present process would be identical with those which have been obtained by etherifying $\Delta^4$-3-oxo-19-norsteroids. Especially in view of the fact that it is not very easy to isomerise the $\Delta^{5(10)}$-3-oxo-19-norsteroids to the corresponding $\Delta^4$-3-ketones, it would have been expected that $\Delta^{3,5(10)}$-3-enolethers would be formed. Surprisingly, however, the $\Delta^{3,5}$-3-enolethers of the present process are very pure and are obtained in a high yield. The yields are considerably higher than can be obtained by the known processes (that is to say with preliminary isomerisation).

The etherifying agents to be used in the new process are those which are conventionally employed in the manufacture of enolethers, for example ortho-esters of carbonic acid, silicic acid or more especially formic acid, for example those of lower aliphatic or araliphatic alcohols, especially lower alkanols, such as methanol, ethanol, propanol, isopropanol, butanol or isobutanol or, for example, benzyl alcohol. It is of special advantage to use an orthoformic acid lower-alkyl ester, primarily orthoformic acid ethyl ester.

As acidic catalyst there may be used any one of those known for formation of enolethers, for example inorganic or organic acids, or acid salts, for example mineral acids such as hydrochloric acid, perchloric acid or especially sulphuric acid, organic sulphonic acids such as methanesulphonic or toluenesulphonic acid, or salts of mineral acids and organic nitrogen bases, such as pyridine hydrochloride.

The reaction according to this invention is advantageously performed in the presence of a solvent or diluent, for example of an alcohol such as methanol or ethanol, or of an ether such as diethyl ether or tetrahydrofuran, or of a hydrocarbon, such as hexane, cyclohexane or benzene, preferably under anhydrous conditions, at room temperature or preferably at an elevated temperature, if necessary under superatmospheric pressure and/or under an inert gas, for example nitrogen. According to a particularly favourable variant the $\Delta^{5(10)}$-19-norsteroid is dissolved in an absolute alcohol, for example in ethanol, whereupon the etherifying agent, for example orthoformic acid ethyl ester, is added and the mixture is heated to 50–100°C., advantageously to 85°C. In general, the reaction sets in immediately after the acidic catalyst has been added and is complete after a few, generally 5, minutes. To prevent resplitting of the enolether formed, the reaction mixture is neutralised and/or cooled immediately after the reaction, and the enolether is isolated in the known manner, for example by crystallisation or extraction.

Starting materials suitable for use in the present process are $\Delta^{5(10)}$-3-oxo-19-norsteroids, for example those of the cholane, cholestane, spirostane or cardanolide series and more especially those of the pregnane or androstane series; they may contain further substituents, for example in one or several of the positions 1, 2, 7, 9, 11, 12, 14–17 and in the side-chain, for example alkyl such as methyl groups, halogen such as fluorine or chlorine atoms, free, esterified or etherified hydroxyl groups, free or ketalised oxo groups, oxido groups and/or double bonds. The starting materials are known; insofar as they are new they can be manufactured by known methods, for example by decarboxylating $\Delta^4$-3-oxosteroid-19-acids, by pyrolysing $\Delta^4$-3-oxo-19-hydroxysteroids with copper powder, or by reducing $\Delta^{1,3,5(10)}$-3-alkoxysteroids with an alkali metal in liquid ammonia, followed by acid hydrolysis of the $\Delta^{2,5(10)}$-3-alkoxysteroids formed.

The $\Delta^{3,5}$-3-enolethers obtained by the present process are important intermediates for the manufacture of pharmacologically valuable 19-norsteroids which may be used, for example, as anabolics, ovulation inhibitors or gestagens. Since they are stable towards alkaline reagents, any oxo groups present, for example, in position 11 and/or 17 or 20 can be reduced with complex metal hydrides to hydroxyl groups which latter, if desired, can be esterified, or a hydrocarbon residue may be introduced into the 17α-position of a 17-oxoandrostane compound in the known manner. Furthermore, the resulting enolethers can be converted into $\Delta^4$-3-oxo-6-hydroxysteroids by reaction with organic per-acids, or into $\Delta^4$-3-oxo-6-halogenosteroids by reaction with halogeno-succinimides or perchloryl-fluoride. When the $\Delta^{3,5}$-3-enolethers are treated with phosgene and dimethylformamide, there are obtained salts of Schiff's bases which yield in the known manner $\Delta^4$-3-oxo-6-methylsteroids and -methylenesteroids.

The following examples illustrate the invention without in any way restricting its scope.

*Example 1*

50 g. of $\Delta^{5(10)}$-3,17-dioxo-19-norandrostene are suspended in 20 ml. of absolute ethanol; 31.5 ml. of orthoformic acid ethyl ester are added, and the mixture is heated with stirring to refluxing (internal temperature 84° C.). The suspension is then rapidly mixed with a solution of 0.2 ml. of concentrated sulphuric acid in 2 ml. of absolute ethanol, whereby the starting material is gradually dissolved to form a faintly yellowish solution which boils violently, the internal temperature dropping to 70° C. After 2 minutes the reaction mixture is cooled within 2 to 3 hours to −10 to −15° C., with crystallisation setting in already at 60° C. The resulting, thick crystal magma is suctioned off, the crystals are washed with a small amount of cold methanol (−15° C.) until the washings run colourless and then dried in vacuo at 35° C. until their weight remains constant, to give $\Delta^{3,5}$-3-ethoxy-17-oxo-19-norandrostadiene melting at 139.5–141.5° C. in a yield of 84.4% of the starting compound's weight. Optical rotation $[\alpha]_D = -87°$ (c.=1%, in dioxane).

Example 2

50 g. of $\Delta^{5(10)}$-3,17-dioxo-19-norandrostene are mixed with 20 ml. of absolute ethanol and 31.5 ml. of orthoformic acid ethyl ester; the suspension is heated to an internal temperature of 84° C., and a solution of 0.36 g. of para-toluenesulphonic acid in 2 ml. of absolute ethanol is stirred in. Working up as described in Example 1 gives $\Delta^{3,5}$-3-ethoxy-17-oxo-19-norandrostadiene in a yield of 88.4% of the starting compound's weight.

Example 3

A suspension of 250 g. of $\Delta^{5(10)}$-3,17-dioxo-19-norandrostene in 100 ml. of absolute ethanol and 160 ml. of orthoformic acid ethyl ester is heated with stirring to an internal temperature of 84° C. A solution of 1 ml. of methanesulphonic acid in 10 ml. of absolute ethanol is rapidly added, and the reaction mixture turns frothy with the reaction setting in. After 2 minutes the batch is cooled and worked up as described in Example 1, to give $\Delta^{3,5}$-3-ethoxy-17-oxo-19-norandrostadiene in a yield of 90% of the starting compound's weight.

Example 4

A mixture of 50 g. of $\Delta^{5(10)}$-3,17-dioxo-19-norandrostene, 20 ml. of absolute ethanol and 31.5 ml. of orthoformic acid ethyl ester is mixed at 84° C. with a solution of 5 g. of pyridine hydrochloride in 20 ml. of absolute ethanol, and the batch is worked up as described in Example 1; there is obtained $\Delta^{3,5}$-3-ethoxy-17-oxo-19-norandrostadiene in a yield of 88% of the starting compound's weight.

Example 5

500 mg. $\Delta^{5(10)}$-3,20-dioxo-19-norpregnene are mixed at room temperature with 0.2 ml. of anhydrous ethanol and 0.275 ml. of orthoformic acid ethyl ester. The suspension is well stirred and there are added 0.02 ml. of a catalyst consisting of 1 part per volume of methane sulphonic acid and 10 parts per volume of anhydrous ethanol. A clear solution has formed after 40 seconds which is stirred on for another 30 minutes at 15–20° C. 1 drop of pyridine and 1 ml. of anhydrous ethanol are then added to the reaction mixture and the whole is kept without stirring at −15° C. in a freezing mixture for 5–6 hours. Before filtering the crystalline precipitate thus formed the mixture is diluted with stirring with 1 ml. of anhydrous ethanol having a temperature of −15° C. The filtered crystals are then washed with another portion of 1 ml. of anhydrous ethanol of the said temperature and the filter cake is then dried in a vacuum of 2 mm. at 35° C. The yield of this product is 320 mg., viz. 55% of the theoretical amount. $F = 85-91°$ C. with decomposition beginning at 83° C. UV absorption: $\lambda_{max} = 242$ m$\mu$; $\epsilon = 20,000$; IR spectrum: 20-ketone band at 5.9$\mu$, 3-enolether double band at 6.07 and 6.17 further at 7.27 and 7.4$\mu$. Further characteristic band at 8.55$\mu$. The product may be recrystallized from anhydrous ethanol; it then melts at 97–100° C. (corr.), with incipient decomposition at 93.5° C.; $[\alpha]_D^{25} = -31 \pm 1°$ (c.=1% in dioxane). UV absorption: $\lambda_{max} = 242$m$\mu$, $\epsilon = 19,800$.

What is claimed is:

1. Process for the manufacture of $\Delta^{3,5}$-3-enolethers of $\Delta^4$-3-oxo-19-norsteroids, wherein $\Delta^{5(10)}$-3-oxo-19-norsteroids are reacted with an etherifying agent in the presence of an acidic catalyst, said etherifying agent and acidic catalyst being those conventionally employed in the formation of enolethers.

2. Process as claimed in claim 1, wherein the reaction is performed under anhydrous conditions in a solvent selected from the group consisting of an alcohol, an ether and a hydrocarbon.

3. Process as claimed in claim 2, wherein ethanol is used as solvent and the reaction is conducted at a temperature of 50–100° C.

4. Process as claimed in claim 3, wherein the reaction mixture is neutralized and cooled immediately after the conversion has taken place.

5. Process as claimed in claim 1, wherein there is used as the etherifying agent a member selected from the group consisting of an ester of ortho carbonic, ortho silicic and ortho formic acid.

6. Process as claimed in claim 5, wherein ortho formic acid ethyl ester is used.

7. Process as claimed in claim 1, wherein there is used as the acidic catalyst a member selected from the group consisting of sulfuric acid, methane sulfonic acid, p-toluene sulfonic acid and pyridinium hydrochloride.

8. Process as claimed in claim 1, wherein a $\Delta^{5(10)}$-3-oxo-19-norsteroid of the pregnane series is used.

9. Process as claimed in claim 1, wherein a $\Delta^{5(10)}$-3-oxo-19-norsteroid of the androstane series is used.

10. Process as claimed in claim 8, wherein $\Delta^{5(10)}$-3,20-dioxo-19-norpregnene is used.

11. Process as claimed in claim 9, wherein $\Delta^{5(10)}$-3,17-dioxo-19-norandrostene is used.

No references cited.

LEWIS GOTTS, *Primary Examiner.*

HENRY A. FRENCH, *Assistant Examiner.*